Feb. 18, 1964    R. E. PRICE    3,121,596
SPINDLE BEARINGS
Filed Oct. 7, 1960
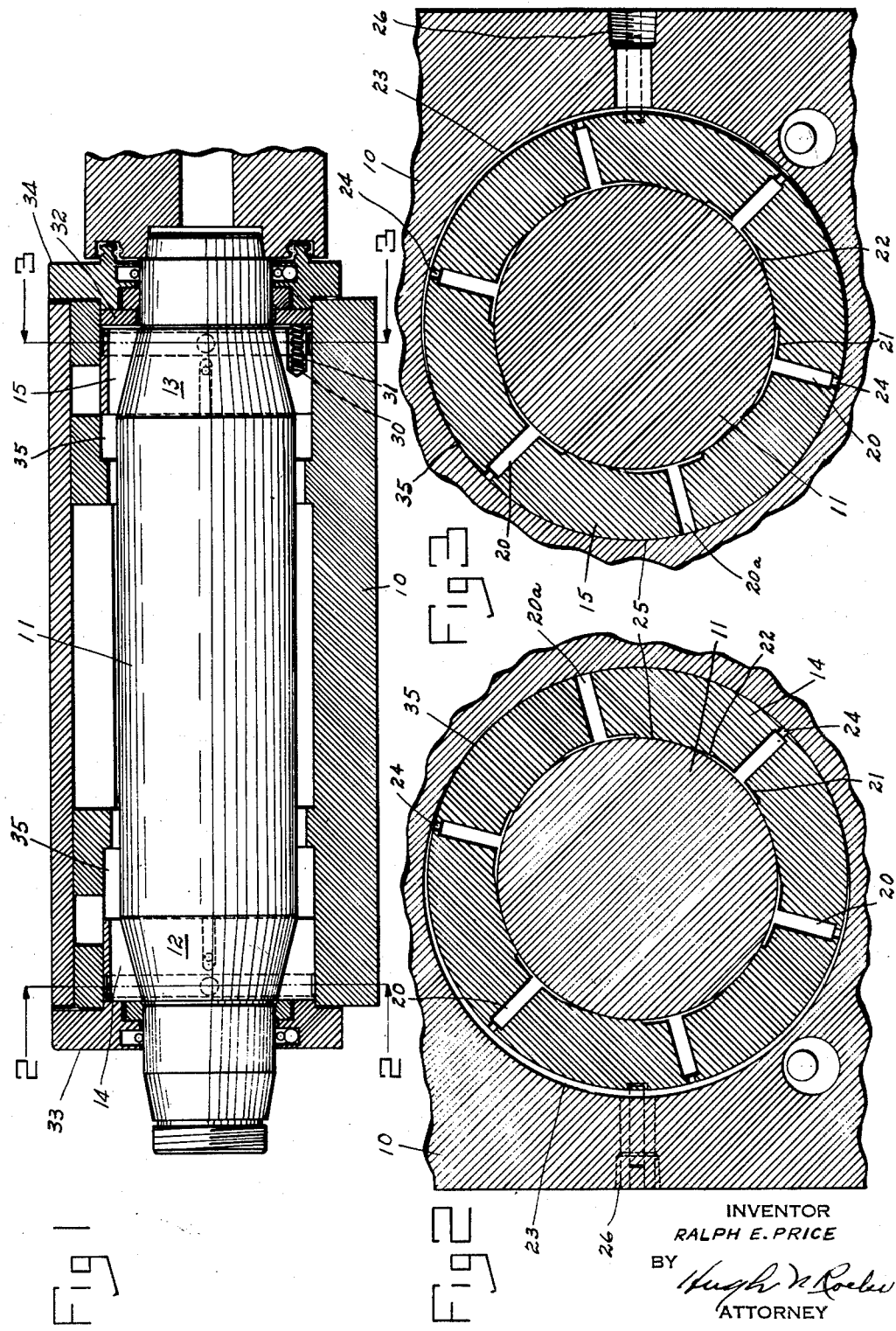
INVENTOR
RALPH E. PRICE
BY
ATTORNEY United States Patent Office 3,121,596
Patented Feb. 18, 1964

3,121,596
SPINDLE BEARINGS
Ralph E. Price, Waynesboro, Pa., assignor to
Landis Tool Company, Waynesboro, Pa.
Filed Oct. 7, 1960, Ser. No. 61,251
10 Claims. (Cl. 308—71)

This invention relates to spindle mountings for machine tools.

Conventional spindle mountings consist of a spindle having axially spaced cylindrical portions, especially designed and prepared to serve as journals.

Such journals are generally supported by any of a variety of generally cylindrical bearing members which may consist of individual peripherally spaced bearing shoes or peripherally spaced bearing surfaces in a single piece bearing. Such bearings all require radial adjustment to provide a predetermined clearance between the bearings and journals.

It is, therefore, an object of the present invention to provide a bearing arrangement in which a substantially zero clearance is automatically maintained between the bearings and journals and also between the bearing and its housing.

Another object is to provide a spindle having axially spaced journal portions tapered in opposite directions toward the ends of the spindle with correspondingly tapered bearing members.

Another object is to provide a fixed shoulder for supporting one of said bearings and resilient means operable against the other bearing so as to draw said bearings toward one another on said spindle and to maintain a near zero clearance between the bearings and the spindle.

In the few tapered bearing arrangements found in the prior art, the bearings are solid rather than split. Because of this, it is necessary that there be a certain amount of clearance between the bearings and the bore in which they are mounted in order to permit insertion of the bearings in the bore. So long as this clearance exists, it does not matter how close the bearing and spindle are fitted, because there will always be a certain amount of shake between the bearing and the bore. Forces which assure minimum clearance between the spindle and bearing also provide minimum clearance between the bearing and bore in the housing.

In the prior art, it was recognized that there is axial movement of the spindle due to oil film between the spindle and bearing and also due to thermal expansion of the spindle. This condition is recognized in one instance by inserting pre-loaded anti-friction bearings between the spindle and bore to permit endwise movement of said bearing and also to eliminate shake between the bearing and housing. In one of the prior art arrangements, resilient means is provided for effecting an axial clamping action of the bearings on the spindle. This force is not sufficient, however, to counteract the effect of the oil film which forms under pressure between the spindle and bearings when the spindle is rotated and acts in opposition to said clamping force. In order to balance this force, the resilient means is supplemented by fluid pressure.

Another object of this invention is to provide means whereby the forces exerted by oil film pressure and spindle expansion may help to eliminate any clearance or shake between the bearings and the bore of the housing.

Another object is to provide a resilient load sufficient to oppose all the axial forces acting on the spindle and bearings and convert a part of said forces to expand said bearings against said housing.

Another object is to provide means whereby the forces urging one of said bearings against the bore are modified under certain circumstances so as to permit endwise movement of the bearings in response to the axial thrust force.

Another object is to provide bearing members which are split axially so that they may expand against the bore in the housing.

FIG. 1 is a sectional front elevation of the spindle housing, spindle and bearings.
FIG. 2 is a sectional end elevation through the left hand bearing taken along line 2—2 of FIG. 1.
FIG. 3 is a sectional end elevation through the right hand bearing taken along line 3—3 of FIG. 1.

Numeral 10 indicates the spindle housing, in this case, the wheelbase of a grinding machine. 11 is a spindle having tapered journals 12 and 13. Spindle 11 is rotatably supported in tapered bearings 14 and 15. Each bearing member 14 and 15 has a plurality of peripherally spaced, longitudinally extending radial slots 20 on its internal surface. One of said slots 20a extends through the entire wall of bearings 14 and 15 and makes possible radial expansion of bearings 14 and 15.

Each bearing member 14 and 15 is slotted and then machined to a diameter identical to that of the diameter of bore 35 in which it is to be inserted. When a bearing is inserted in bore 35, it is slightly compressed. Thereafter, it assumes the machined diameter so that it is in tight contact with bore 35. The force of springs 31 has radial components in each bearing which supplement the radial force which is inherent in the bearings.

At the inner end of each slot is a shallow clearance portion 21 extending lengthwise of bearings 14 and 15 and having one side 22 tapered in the direction of rotation of spindle 11. Between adjacent clearances, there is a land or bearing surface 25 which contacts the surface of journals 12 and 13.

An eccentric or tapered groove 23 is formed around one end of the peripheral surface of each bearings 14 and 15. Groove 23 is long enough to reach each of the slots 20 by restricted passages 24. The depth of groove 23 varies in accordance with the number of restricted passages 24 to be served to provide equal distribution of oil to each element of the bearings. The cross-section of groove 23 is reduced to the point where it becomes a restriction before it reaches slot 20a which has no restriction 24. The restriction provided by groove 23 prevents a too rapid flow of oil to unrestricted slot 20a which would reduce the flow of oil to the other slots 20. Oil is supplied to the bearings from any suitable source through passages 26 in the deep portion of groove 23.

The right hand bearing 15 has a plurality of angularly spaced holes 30 on its outer face. Springs 31 in each hole 30 have a free length greater than the depth of holes 30. Springs 31 in bearing member 15 are pre-loaded by end cap 34 through thrust collar 32. End cap 34 is attached to housing 10 by screws (not shown) which also serve to apply the pre-load to springs 31. This load is transmitted from bearing member 15 through spindle 11 and through bearing member 14 to end cap 33 which is attached to the other end of housing 10.

Operation

Once the bearings 14 and 15 are assembled in housing 10, springs 31 urge bearing 15 and spindle 11 to the left into bearing 14. Bearing 14 is thus held radially in zero clearance relation with housing 10. There is also zero clearance relation between bearing 14 and journal 12 of spindle 11.

Bearing 15 is urged radially by being forced axially against journal 13 on spindle 11 by springs 31 and bearing 14. Thus, even when spindle 11 is at rest, it is held in zero clearance relation with bearings 14 and 15 by the action of springs 31 on bearing 14. In turn, bearings 14 and 15 are held in zero clearance relation with housing 10.

Once spindle 11 begins to rotate, an oil film is built up between journal 12 and bearing 14 which causes spindle 11 to move slightly to the right. At the same time, an oil film is built up between journal 13 and bearing 15 so that bearing 15, in spite of the zero clearance relation with housing 10, is forced to move to the right against springs 31 by the pressure of the oil film.

When spindle 11 stops, springs 31 again add their force to move bearing 15 and spindle 11 to the left, squeezing out most of the oil film and maintaining a zero clearance relation between journals 12 and 13 and their respective bearings 14 and 15 and between said bearings and the bores 35 in which they are inserted.

I claim:

1. Supporting means for a rotatable shaft having spaced tapered journal portions, bearing members for said journal portions, a housing for said shaft and said bearing members, a bore in said housing for each of said bearing members, said bearing members having a tapered bearing surface corresponding to that of said journal portions, means for applying an axial load on the outer end of one of said bearing members, the degree of taper being such as to permit a cam action of said journal portions on said bearing members in response to said axial load on said bearing members, a positive support surface on said housing for supporting said second bearing member against said axial load, said bearing members being split axially to permit expansion against the peripheral surface of said bore in response to a radial force resulting from said axial load and said cam action.

2. A spindle mounting for a machine tool comprising a spindle having axially spaced journals tapered in opposite directions, a housing, a bore in said housing, axially spaced bearing members in said bore having bearing surfaces tapered to correspond to the respective journals, means to apply an axial load to said bearings, each of said bearing members being split to allow expansion into engagement with said bore in response to said load.

3. A spindle mounting for a machine tool comprising a spindle having axially spaced journals tapered in opposite directions, a housing, a bore in said housing, axially spaced bearing members in said bore having bearing surfaces tapered to correspond to the respective journals, peripherally spaced axial slots in said bearing surfaces, each of said bearing members being split to allow expansion into engagement with said bore, a tapered peripheral groove in the outer surface of each bearing member for providing uniform distribution of oil to each of said slots, and a passage in said housing for conducting oil to each of said grooves.

4. A spindle mounting for a machine tool comprising a spindle having axially spaced journals tapered in opposite directions, a housing, a bore in said housing, axially spaced bearing members in said bore having bearing surfaces tapered to correspond to the respective journals, each of said bearing members being split to allow expansion into engagement with said bore, and means to exert axial forces between said journals and said bearing members to effect said expansion.

5. A spindle mounting for a machine tool comprising a spindle having axially spaced journals tapered in opposite directions, a housing, a bore in said housing, axially spaced bearing members in said bore, said bearing members having bearing surfaces tapered to correspond to the respective journals, each of said bearing members being split to allow expansion into engagement with said bore, means to hold one of said bearing members in fixed axial position, and means to permit limited axial movement of said other bearing member.

6. A spindle mounting for a machine tool comprising a housing having a bore therein, a spindle member having axially spaced journal portions tapered in opposite directions, axially spaced bearing members in said bore having bearing surfaces tapered to correspond to said journal portions, said bearing members being arranged to expand radially against said bore, means for automatically maintaining a uniform minimum clearance between said journal portions and said bearing members equal to the thickness of the oil film comprising resilient means for urging one of said bearing members axially, means on said housing for holding the other of said bearing members against axial movement, a portion of said force being exerted by said resilient means in the form of a cam action between said journal portions and said bearing members to urge said bearing members into engagement with said bore.

7. A spindle mounting for a machine tool comprising a housing having a bore therein, a spindle member having axially spaced journal portions tapered in opposite directions, axially spaced bearing members in said bore having bearing surfaces tapered to correspond to said journal portions, said bearing members being split axially, a supply of oil for said bearing members, means for automatically maintaining a uniform minimum clearance between said journal portions and said bearing members equal to the thickness of the oil film comprising resilient means for urging one of said bearing members axially, means on said housing for holding the other of said bearing members against axial movement, the force exerted by said resilient means being applied partially in the form of a cam action of said journal portions against said bearing members in a radial direction.

8. A spindle mounting for a machine tool comprising a housing having a bore therein, a spindle member having axially spaced journal portions tapered in opposite directions, axially spaced bearing members in said bore having bearing surfaces tapered to correspond to said journal portions, each of said bearing members being split axially to permit expansion of said bearing members into engagement with said bore, one of said bearing members being held against axial movement, means for exerting endwise pressure against the other of said bearing members whereby the journal portions exert an expanding force on each of said bearing members and thus remove substantially all clearance between said bearing members and said bore.

9. A bearing member of the type described in claim 8 arranged so that the axial force applied to one of said bearing members reduces the clearance between both bearing members and their respective journal portions.

10. A device of the type described in claim 8 having a supply of lubricant for each of said bearing members, the rotation of said spindle member being effective to generate pressure in the lubricant between said journal portions and said bearing members, said pressure serving to provide additional expanding force on said bearing members.

References Cited in the file of this patent

UNITED STATES PATENTS

| | | |
|---|---|---|
| 1,374,267 | Whitehead | Apr. 12, 1921 |
| 2,244,734 | Severance | June 10, 1941 |
| 2,389,687 | Rickenmann | Nov. 27, 1945 |
| 2,822,223 | Offen | Feb. 4, 1958 |
| 2,941,851 | Bayer | June 21, 1960 |